US008990022B2

(12) United States Patent
Fernihough

(10) Patent No.: US 8,990,022 B2
(45) Date of Patent: Mar. 24, 2015

(54) DIRECT VELOCITY SEISMIC SENSING

(71) Applicant: PGS Geophysical AS, Lysaker (NO)

(72) Inventor: Robert A. P. Fernihough, Gloucester (GB)

(73) Assignee: PGS Geophysical AS, Oslo (NO)

( * ) Notice: Subject to any disclaimer, the term of this patent is extended or adjusted under 35 U.S.C. 154(b) by 0 days.

(21) Appl. No.: 14/135,897

(22) Filed: Dec. 20, 2013

(65) Prior Publication Data

US 2014/0112094 A1 Apr. 24, 2014

Related U.S. Application Data

(63) Continuation-in-part of application No. 12/655,111, filed on Dec. 23, 2009, now Pat. No. 8,645,071.

(51) Int. Cl.
*G01V 1/00* (2006.01)
*G01P 13/00* (2006.01)
*G01V 1/18* (2006.01)
*G01V 1/38* (2006.01)

(52) U.S. Cl.
CPC .............. G01V 1/181 (2013.01); G01V 1/3808 (2013.01)
USPC ......................................... 702/18; 73/170.33

(58) Field of Classification Search
USPC ............. 702/18, 1–2, 127, 142, 189; 73/1.37, 73/1.41, 170.33; 367/15, 20; 356/27
See application file for complete search history.

(56) References Cited

U.S. PATENT DOCUMENTS

| 3,003,127 | A | 10/1961 | Habib |
| 3,974,504 | A | 8/1976 | Engdahl |
| 4,322,829 | A | 3/1982 | Davis, Jr. et al. |
| 4,742,998 | A | 5/1988 | Schubert |
| 5,134,882 | A | 8/1992 | Taylor |
| 5,289,434 | A | 2/1994 | Berni |
| 5,724,306 | A * | 3/1998 | Barr ................................ 367/15 |
| 5,903,349 | A | 5/1999 | Vohra et al. |
| 6,281,976 | B1 | 8/2001 | Taylor et al. |
| 6,336,365 | B1 | 1/2002 | Blackadar et al. |
| 6,693,848 | B1 * | 2/2004 | Ambs et al. .................... 367/149 |
| 6,850,461 | B2 | 2/2005 | Maas et al. |
| 6,921,894 | B2 | 7/2005 | Swierkowski |
| 2006/0192974 | A1 | 8/2006 | Li |

FOREIGN PATENT DOCUMENTS

DE 3307575 9/1984

OTHER PUBLICATIONS

Jidong Wei,"Comparing the MEMS Accelerometer and the Analog Aeophone", The Leading Edge, Oct. 2013, pp. 1206-1210.

* cited by examiner

*Primary Examiner* — Toan Le

(57) ABSTRACT

A disclosed direct velocity seismic sensor includes a housing, a proof mass suspended in the housing by a resilient component, and a motion dampener that damps oscillation of the proof mass to a degree that displacement of the proof mass relative to the housing is substantially linearly proportional to a rate of change of seismic displacements of the housing over a frequency range of interest. A described method for constructing a seismic sensor includes using a calculated resonant frequency to determine a damping factor that causes the displacement of the proof mass to be substantially proportional to the rate of change of seismic displacement of the housing. One illustrative disclosed system includes an optical velocity sensor and a detector where a light beam produced by the velocity sensor and a reference beam interfere at the detector, and the detector produces a signal indicative of a velocity experienced by the velocity sensor.

19 Claims, 4 Drawing Sheets

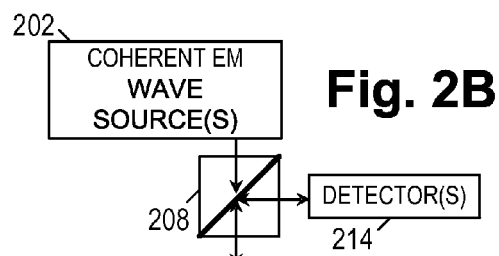
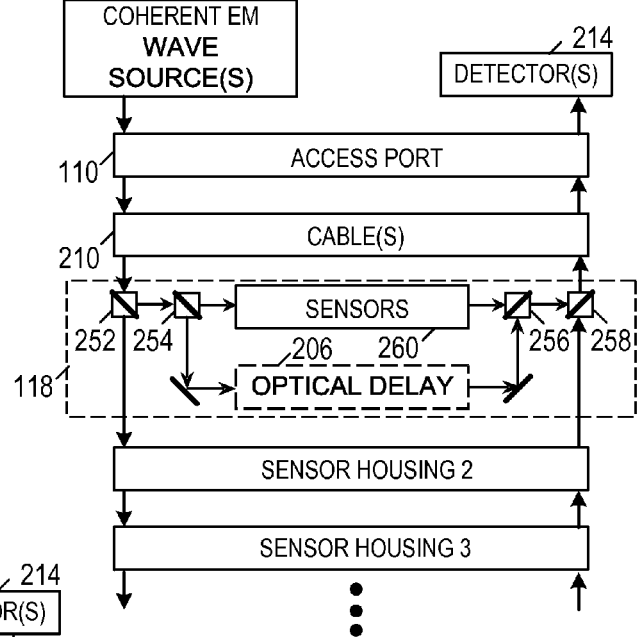
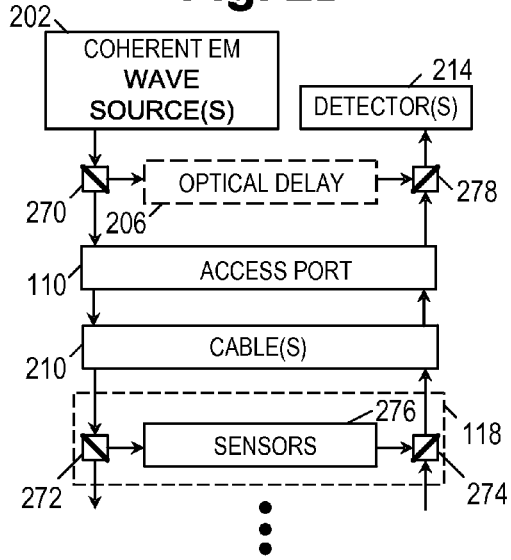

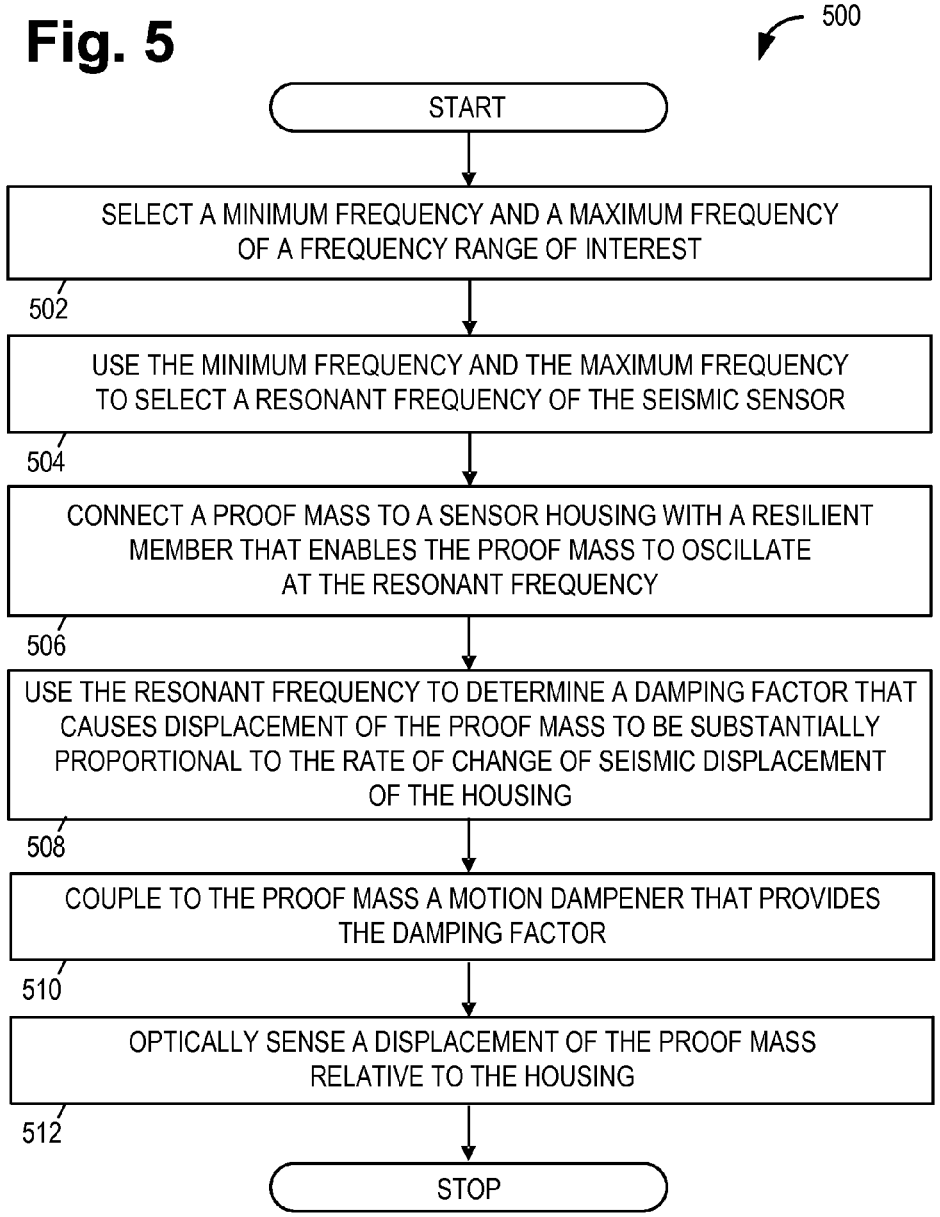

DIRECT VELOCITY SEISMIC SENSING

CROSS-REFERENCE TO RELATED APPLICATIONS

The present application incorporates by reference and claims priority as a continuation-in-part to U.S. patent application Ser. No. 12/655,111, titled "Direct Velocity Seismic Sensing" and filed Dec. 23, 2009, by inventor Robert Fernihough.

BACKGROUND

Marine seismic explorations usually employ seismic sensors below the water's surface, e.g., in the form of streamers towed behind a ship or cables resting on the ocean floor. A typical seismic streamer includes multiple sensors positioned at spaced intervals along its length, and often many such streamers or cables positioned in parallel lines over the survey region.

An underwater seismic wave source, such as an air gun, produces pressure waves that travel through the water and into the underlying earth. When such waves encounter changes in acoustic impedance (e.g., at a boundary or layer between strata), a portion of the wave is reflected. The waves reflected from subsurface layers are called "seismic reflections". The seismic streamers or cables provide an array of seismic sensors to detect these seismic reflections and convert them into signals for storage and processing.

One notable consequence of operating in the marine environment is the presence of "ghost reflections" caused by pressure wave reflections off the water's surface. The downward-moving ghost reflections can interfere with the sensors' measurements of the upward-moving seismic reflections, causing substantial amplitude enhancements at some frequencies (due to constructive interference), and reductions at other frequencies (due to destructive interference).

To address this issue, the industry developed the usage of dual sensors at each sensing node. A pressure sensor ("hydrophone") and a velocity sensor ("geophone") provide measurements of pressure and (directional) velocity that, when appropriately combined, enable ghost reflections to be filtered out of the survey data. Such techniques are standard in the industry. Accordingly, seismic explorationists have come to expect both types of sensors to be available when specifying parameters for acquiring seismic survey data.

There exists certain technologies that offer potential advantages for conducting long-term seismic monitoring and/or seismic data acquisition in extreme marine environments. As one example, efforts have been made to develop optical seismic sensors that demonstrate high reliability, have long lifetimes, and do not require any electrical power. Such results have resulted in the creation of optical hydrophones and accelerometers, but to date the author is aware of no satisfactory optical geophones.

SUMMARY

Accordingly, there is disclosed herein a technique for direct velocity seismic sensing, along with various sensors and methods that employ this technique. One sensor embodiment includes a housing, a proof mass suspended in the housing by a resilient component, and a motion dampener that damps oscillation of the proof mass to a degree that displacement of the proof mass relative to the housing is proportional to a rate of change of seismic displacements of the housing over a frequency range of interest. A described method for constructing a seismic sensor includes using a calculated resonant frequency to determine a damping factor that causes the displacement of the proof mass to be substantially proportional to the rate of change of seismic displacement of the housing. One illustrative disclosed system includes an optical velocity sensor and a detector where a light beam produced by the velocity sensor and a reference beam interfere at the detector, and the detector produces a signal indicative of a velocity experienced by the velocity sensor.

BRIEF DESCRIPTION OF THE DRAWINGS

A better understanding of the various disclosed embodiments can be obtained when the following detailed description is considered in conjunction with the following drawings, in which:

FIGS. 2A-D show different embodiments of a seismic data acquisition system;

FIG. 5 is a flowchart of an illustrative method for constructing a direct velocity optical seismic sensor.

Figure 1:
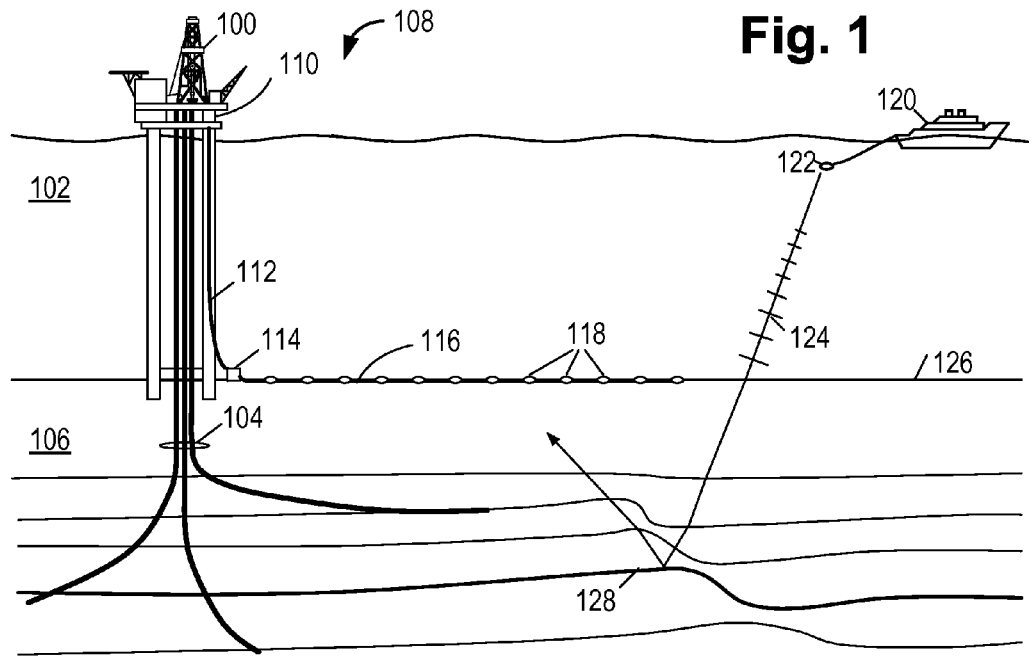
FIG. 1 shows an illustrative marine seismic survey being carried out about an offshore oil platform.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the appended claims.

DETAILED DESCRIPTION

The issues identified in the background are at least partly addressed by the direct velocity sensing technique disclosed herein. Various optical sensors and optical sensing methods that employ this sensing technique are disclosed, and they can be used to provide seismic sensing arrays suitable for permanent monitoring of a subsurface reservoir. Other applications of such sensors and sensing methods include seismic monitoring in remote or extreme environments. Though the following description is given in the context of permanent reservoir monitoring, the disclosed technology is readily adaptable for use in conjunction with conventional seismic data acquisition systems, e.g., for exploration survey sensing with towed marine streamers or ocean-bottom sensor arrays.

FIG. 1 shows a marine seismic survey being carried out about an offshore oil platform 100 located in an ocean 102. Several wells 104 extend downward from the offshore oil platform 100, through the water 102, and into the subsurface 106 below the ocean floor. A seismic sensor system 108 includes an array access port 110, an umbilical cable 112, an aggregator box 114, one or more ocean floor cables 116 extending outwardly from the aggregator box 114, multiple sensor housings 118 positioned along the ocean floor cables 116, and one or more sensors positioned within each of the sensor housings 118.

It is expected that in many cases, the array of seismic sensors will be left permanently in place to enable repeat surveys of the subsurface region around platform 100. (Such repeat surveys enable operators to track movement of reservoir fluids and optimize their exploitation of the subsurface reservoirs.) Port 110 provides surface access to the seismic sensors via optical fibers in the umbilical cable 112 and in the ocean floor cables 116. Operators on platform 100 can connect equipment to the access port 110 to collect seismic survey data as described further below.

The umbilical cable 112 extends from the array access port 110 to the aggregator box 114. In the embodiment of FIG. 1, the aggregator box 114 is located near a base of the offshore oil platform 100, and on the ocean floor 126. The ocean floor cables 116 extend from the aggregator box 114 in a pattern that provides an arrangement of regularly spaced seismic sensor housings 118. The use of optical fibers in cables 116, 118 is expected to enable these cables to be extremely rugged and reliable.

In FIG. 1, a ship 120 is towing a seismic source 122 producing acoustic waves. The seismic source 122 may be or include, for example, an air gun. An acoustic wave 124 produced by the seismic source 122 is shown in FIG. 1. As indicated in FIG. 1, the acoustic wave 124 travels through the water and into the subsurface 106, generating seismic reflections at each of the acoustic impedance changes that it encounters. For clarity, only one such reflection is shown from interface 128.) The array of seismic sensors is positioned to detect many of these reflections as the seismic source is fired at intervals over a set of selected shot locations.

Each of the sensor housings 118 along the ocean floor cable 116 preferably includes multiple sensors such as an optical hydrophone and an optical geophone. Multiple geophones can be provided to permit multi-axial velocity sensing. To prevent movement due to ocean currents or erosion, the sensor housings 118 can be coupled to the sea floor in a robust manner (e.g., via high-density weights or spikes driven into the ocean floor), permitting the location and orientation of the sensors to be precisely determined and documented. Because the system 108 employs optical sensors driven by light via optical fibers, it requires no underwater electronic components or electrical power, thereby eliminating problems from short circuits, corrosion in electrical connectors, and the like.

Figure 2A:
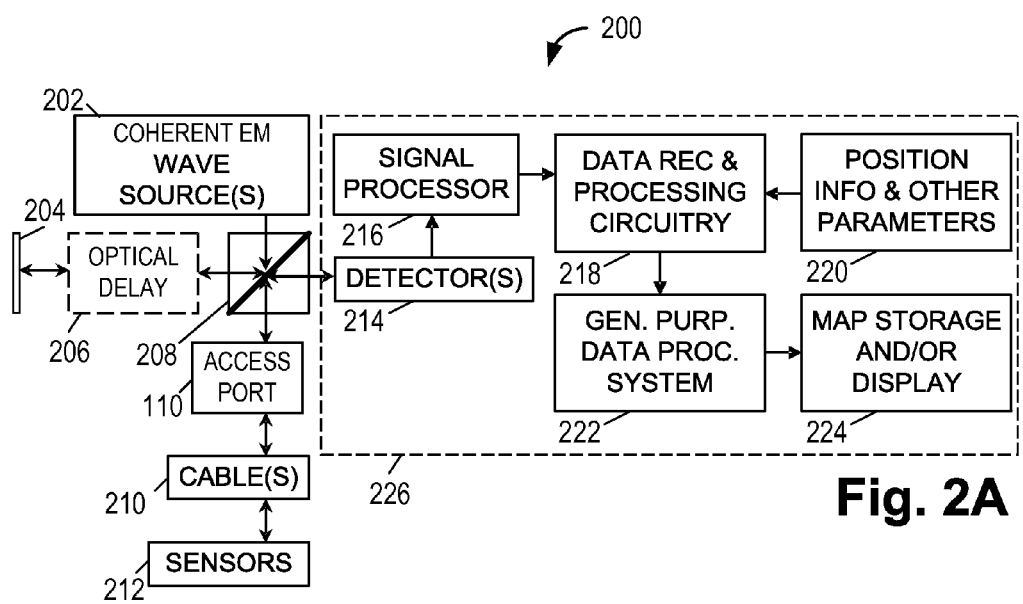

FIG. 2A is a diagram of one embodiment of a seismic data acquisition system 200. In the embodiment of FIG. 2A, the seismic data acquisition system 200 includes: one or more coherent light source(s) 202, a mirror 204, an optional optical delay 206, a beam splitter 208, and the seismic sensor system 108 of FIG. 1, represented in FIG. 2A by the array access port 110, one or more cable(s) 210, and sensors 212. Cables 210 represent the cables of the seismic sensor system 108, i.e., the umbilical cable 112 and the ocean floor cable 116, and sensors 212 represent the sensors located in each of the sensor housings 118 of FIG. 1. Also shown is a surface processing facility 226 that includes one or more detector(s) 214, a signal processor 216, data recording and processing circuitry 218, a memory 220 storing position information and other parameters, a general purpose data processing system 222, and a map storage and/or display system 224.

As described above, the array access port 110 provides access to the cables of the seismic sensor system 108 of FIG. 1 (i.e., the umbilical cable 112 and the ocean floor cable 116). The light source(s) 202, the mirror 204, the optional optical delay 206, the beam splitter 208, and the detector(s) 214 are included in equipment (e.g., a portable unit) that couples to the array access port 110 to optically drive sensors 212 and derive signals therefrom. The signal processor 216, recorder 218, and memory 220 can be included in the portable module or provided as part of a separate module that connects to the portable module to digitize and store seismic survey data in the form of seismic traces having position information and other associated parameters. The general purpose data processing system 222 and map storage/display 224 can also be included in the on-site equipment connected to the access port 110, but in many cases the seismic survey data collected by recorder 218 is transported to a central processing facility having substantial computational resources available.

In the embodiment of FIG. 2A, the sensors 212 are optical sensors requiring no electrical power to operate. The coherent light source(s) 202 may be or include, for example, gaseous lasers, solid-state lasers, and semiconductor-based lasers. The light sources 202 produce a beam of light that is received by the beam splitter 208. The beam splitter 208 provides a transmitted portion of the light beam to the sensors 212 via the array access port 110 and the cables 210, and a reflected portion of the light beam to an optional optical delay 206. The beam passing through the optical delay 206 is reflected off a fixed mirror 204 to create a reference beam that is returned to the beam splitter 208.

Light passing through the optional optical delay 206, from one side to an opposite side, is delayed due to travel time. Such delays can be provided by a number of mechanisms, though a spool of optical fiber is often the most practical method. In some embodiments, the optical delay time of the optional optical delay 206 is substantially equal to half of a delay time experienced by the transmitted portion of the light beam in traveling from the beam splitter 208 to the sensors 212. Thus, the light that traverses the delay twice experiences roughly the same travel time as the light that passes through the sensors 212. With light sources having extremely long coherence times, the optical delay can be omitted without adverse effect.

Each of the sensors 212 receives the transmitted portion of the light beam from the beam splitter 208 via the access port 110 and the cables 210, and modifies the received light beam in response to a measured quantity (e.g., pressure, temperature, acceleration, velocity, etc.). This modified light beam has at least one characteristic (e.g., amplitude and/or phase) indicative of the measured quantity. This modified ("measurement") beam is returned to the beam splitter 208 via the cables 210 and the array access port 110.

The beam splitter 208 provides the detectors 214 with a combined beam that includes both the reference beam and the measurement beam. The reference beam and measurement beam interfere with each other, causing the detectors to sense a light intensity that varies based on the path length difference between the reference and measurement beams. For example, if the path length difference is some integer number of wavelengths, the beams interfere constructively to produce increased light intensity. Conversely, if the path lengths differ by an odd multiple of a half wavelength, the beams interfere destructively to produce decreased light intensity. The detectors are accordingly able to sense changes in the path length difference as cycles in the intensity of the light.

The coherent light provided to the sensors 212 is multiplexed so that the measurement beams produced by the various sensors 212 can be differentiated from one another. For example, the coherent light provided to the sensors 212 may be wavelength (frequency) multiplexed such that each of the sensors 212 receives coherent light within a different range of wavelengths (frequencies). To enable such multiplexing, the coherent light source 202 should generate a broadband beam, possibly by using multiple sources each producing light in a different band. Conversely, the detector 214 can include multiple detectors, each designed to respond to a different one of the multiple ranges of wavelengths (frequencies).

Alternatively, the coherent light returned from the sensors 212 can be time division multiplexed such that each of the sensors 212 receives light within the same range of wavelengths (frequencies), but returns a measurement beam at different times. With time division multiplexing, the coherent light source(s) 202 may include a single source producing coherent light within a single range of wavelengths (frequencies). Different periods of time would be associated with each of the sensors 212, and the measurements made by detector 214 at those times are associated with the corresponding sensor.

Signal processor 216 may be or include, for example, an analog to digital converter that receives the analog signals produced by the detector(s) 214, and produces digital data corresponding to the analog signals. The data recording and processing circuitry 218 is a data acquisition system with a interface enabling a user to program and control the acquisition process using a computer system such as a laptop computer or a desktop computer. The data recording and processing circuitry 218 receives the digital data produced by the signal processor 216, and accesses the memory 220 to retrieve the position information and other parameters corresponding to each of the sensors 212. The acquisition system also collects position information for the seismic shots or at least time-stamp information that enables the correct shot locations to be determined later. The acquisition system 218 combines the digital data form the signal processor 216 with the position information and other parameters to obtain and store seismic traces. The seismic survey data collected in this manner is then made available to the general-purpose data processing system 222.

The general-purpose data processing system 222 may be or include, for example, a personal computer, an engineering workstation, a mainframe computer, or the like. The general-purpose data processing system 222 performs one or more seismic processing operations on the seismic survey data to construct a model of the subsurface in the survey region, thereby producing seismic attribute maps, images, and/or other information for users. Such information can be displayed via a display system 224 and/or stored for later use. The map storage and/or display system 224 may include, for example, a data storage device for storing the image information, and/or a computer monitor for displaying the image information.

FIG. 2B shows an alternative embodiment of a portion of the seismic data acquisition system 200. In this embodiment, a beam splitter 250, optical delay 206, and a mirror 204 are positioned near the sensors 212, e.g., in the aggregation box 114 or one in each sensor housing 118. The beam splitter 250 splits the coherent light beam into a reference beam and a measurement beam as described above, and further recombines the beams as described above. However, because these components are positioned at the far end of cables 210, the optical delay 206 can be much shorter. Moreover, the attenuation experienced by each beam will be better matched.

FIG. 2C shows another alternative embodiment of a portion of the seismic data acquisition system 200. In this embodiment, the light to the sensors travels a separate path than the light returned from the sensors. Separate optical fibers are provided in cables 210 for down-going and up-going light beams. Within each sensor housing 118, a band-limited splitter 252 extracts a selected band of light from the incoming light fiber, routes the extracted band to a splitter 254 that creates a measurement beam and a reference beam. The measurement beam passes through sensors 260, while the reference beam passes through an optical delay 206. The two beams are recombined by a second splitter 256 and inserted in beam on the outgoing light fiber by a second band-limited splitter 258. As with the embodiment of FIG. 2B, the optical delay element is quite small and the attenuation of the two beams is automatically matched. However, the component count is higher.

FIG. 2D shows a separate-path embodiment in which the reference beam is generated at the surface by splitter 270 and recombined with the measurement beams by splitter 278. In this embodiment, each sensor housing 118 only requires the optical sensors and the band limited splitters 272, 274. (As before, band-limited splitter 272 extracts a selected band from the downgoing fiber and band-limited splitter 274 inserts the modified beam onto the upgoing fiber.) Further implementation details can be found in U.S. Pat. No. 6,850,461 "Fiber-Optic Seismic Array Telemetry, System, and Method" by S. J. Maas et al.

Figure 3A:
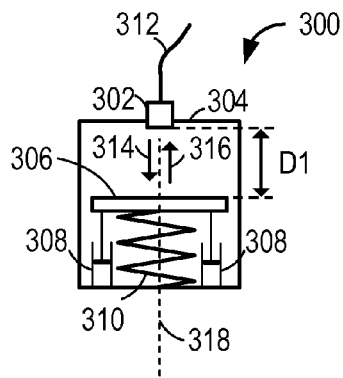
FIGS. 3A-C show different embodiments of a direct velocity sensor.

FIG. 3A is a diagram of one embodiment of a direct velocity sensor 300. One or more of the sensors 212 of the seismic data acquisition system 200 of FIGS. 2A-D may be or include such a direct velocity sensor 300. In the embodiment of FIG. 3A, the direct velocity sensor 300 includes a housing 304, a proof mass 306, a resilient component 310, a motion dampener 308, and a terminator 302 for an optical fiber 312. In the embodiment of FIG. 3A, the proof mass 306, the motion dampener 308, and the resilient component 310, are positioned within the housing 304. A terminator 302 mounts the optical cable 312 to an upper wall of the housing 304.

The terminator 302 receives coherent light (e.g., laser light) from the cable 312, and directs the coherent light, labeled 314 in FIG. 3A, toward an upper surface of the proof mass 306. The upper surface of the proof mass 306 is adapted to reflect a substantial portion of the incident coherent light 314. That is, the upper surface of the proof mass 306 is preferably highly reflective with respect to the incident coherent light 314. The coherent light 314 from the terminator 302 strikes the upper surface of the proof mass 306 and reflects back toward the terminator 302 as modified coherent light 316. The terminator 302 receives the modified coherent light 316 from the upper surface of the proof mass 306 and directs the modified coherent light 316 to the cable 312.

The proof mass 306 is suspended within the housing 304 by the resilient component 310, represented in FIG. 3A by a coil spring. Resilient component 310 provides a restoring force that operates to return the proof mass 306 to its original position once external excitations cease. The resilient component 310 may be or include, for example, one or more springs such as coil springs and/or leaf springs. It can also be a compressible liquid or gas. The resilient component 310 may also be or include, for example, one or more elements formed of a resilient material such as rubber or foam. Alternatively, the resilient component 310 may be or include a cantilever beam, such as a cantilever beam of a micro-electromechanical system (MEMS) device. In some embodiments, the resilient component is coupled to the proof mass by a substantially incompressible fluid (i.e., by a hydraulic mechanism).

In the embodiment of FIG. 3A, the resilient component 310 is shown positioned between the proof mass 306 and a lower wall of the housing 304 opposite the upper wall through which the terminator 302 extends. In other embodiments, the resilient component may be positioned between the proof mass 306 and the upper wall of the housing 304, or between the proof mass 306 and both the upper and lower walls of the housing 304. (Note that in the descriptions of these figures the terms "upper" and "lower" refer to positions in the figure and do not imply any particular orientation of the sensor.)

The motion dampener 308 damps movement of the proof mass 306. In FIG. 3A, the motion dampener 308 is represented by a dashpot including a piston that moves within a cylinder containing a fluid (e.g. air, water, oil, or the like). In other embodiments, the motion dampener 308 may be or include other mechanisms using a fluid to damp the movement of the proof mass 306. For example, a fluid may be located between the proof mass 306 and the housing 304 such movement of the proof mass 306 relative to the housing 304 is inelastically resisted (i.e., damped) by the fluid. Further, the housing 104 may be substantially filled with a fluid such that movement of the proof mass 306 within the housing 304 is damped by the fluid.

Alternatively, the motion dampener 308 may be or include a passive electrical circuit that dissipates energy when the proof mass 306 moves relative to the housing 304. Alternatively, the motion dampener can employ active damping, in which energy is added to counter the motion of the proof mass. Active damping can be provided in a number of ways, such as using motion of a secondary proof mass to generate sympathetic currents that induce magnetic fields to counter the motion of the primary proof mass. Another way to provide active damping employs a feedback circuit to generate a drive signal that at least partially counters motion of the proof mass 306 within the housing 104. In yet another alternative motion dampener embodiment, the resilient component itself performs double-duty as a motion dampener. For example, resilient materials such as rubber or foam often dissipate energy in the form of heat when they are compressed or stretched.

In the embodiment of FIG. 3A, the direct velocity sensor 300 has a sensing axis 318 that passes substantially through a center of the direct velocity sensor 300 and is substantially perpendicular to the upper and lower walls of the housing 304. When the housing 304 experiences a change in velocity with respect to time (i.e., an acceleration) along the sensing axis 318, the momentum of the proof mass 306 delays movement of the proof mass 306 relative to the housing 304, causing relative motion to occur between the proof mass 306 and the housing 304 along axis 318. A distance 'D1' between the upper surface of the proof mass 306 and the terminator 302 either increases or decreases, depending on a direction of the acceleration. As a result of the relative motion between the proof mass 306 and the housing 304, a length of a path that the coherent light travels within the housing 304 either increases or decreases. As a result of the change in path length, a phase of the modified coherent light 316 differs relative to the phase of the reference light beam, enabling a detector at the surface to measure motion of the sensor 300.

As described above, the motion dampener 308 damps the movement of the proof mass 306 within the housing 304. As described in more detail below, a damping factor provided by the motion dampener 308 is selected such the displacement D1 is proportional to the velocity of the housing 304 over a frequency range of interest. More specifically, when the sensor is subjected to oscillatory motion in a specified frequency range, the displacement of the proof mass is linearly proportional to the sensor's velocity so long as the sensor features the appropriate combination of mass, spring constant, and damping.

The proof mass 306, the resilient component 310, and the motion dampener 308 form a mechanical system that converts motion of the housing into relative motion of the proof mass. It can be shown that the ratio between the relative displacement of the proof mass and the displacement of the housing is given by:

$$X(f) = \frac{f^2}{(f^2 - j \cdot 2 \cdot \zeta \cdot f_n \cdot f - f_n^2)},$$

where f is the frequency of the input motion, $f_n$ is the natural or resonant frequency of the system, $\zeta$ is the damping coefficient provided by the motion dampener 308, and j is $\sqrt{-1}$. (The natural frequency of a mechanical system is $$f_n = \frac{1}{2\pi}\sqrt{\frac{k}{m}},$$

where k is the spring constant and m is the oscillating mass.)

In a similar fashion, the ratio between the relative displacement of the proof mass and the velocity of the housing can be shown to be:

$$V(f) = \frac{j \cdot f}{(2 \cdot \pi) \cdot (f_n^2 + j \cdot 2 \cdot \zeta \cdot f_n \cdot f - f^2)},$$

and the ratio between the relative displacement of the proof mass and the acceleration of the housing can be shown to be:

$$A(f) = \frac{1}{(4 \cdot \pi^2) \cdot (f_n^2 + j \cdot 2 \cdot \zeta \cdot f_n \cdot f - f^2)}.$$

Figure 4:
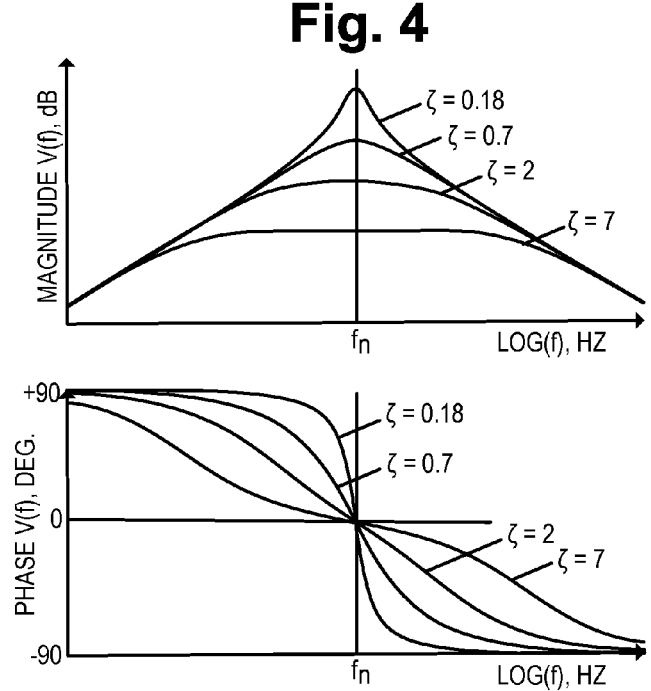
FIG. 4 shows the magnitude and phase of a proof mass's velocity response versus frequency for several values of a damping factor $\zeta$.

Since our interest here is to construct an optical geophone, we select the second equation above for more detailed analysis. FIG. 4 shows the magnitude of V(f), i.e., the displacement of the proof mass 306 relative to a velocity of the housing 304. Both axes are logarithmic, with the vertical axis having units of decibels (dB) and the horizontal axis representing frequency on a logarithmic scale. Also shown is the phase of V(f) (in degrees) versus frequency on a logarithmic scale. In both graphs, the natural frequency is shown for reference.

Of particular interest is the shape of the V(f) magnitude curve. As the damping factor increases, the curve levels out over a substantial frequency range. For $\zeta \geq 2$, there is a range of frequencies about the natural or resonant frequency $f_n$, for which the displacement of the proof mass 306 is substantially directly proportional to the velocity of the housing 304, and this range of frequencies increases for increasing values of the damping factor $\zeta$. At the same time, the V(f) phase curve shows that for $\zeta \geq 2$, the phase is substantially linear (or at least changes gradually) over the range of frequencies for which the displacement of the proof mass 306 is substantially directly proportional to the velocity of the housing 304. Such gradual rates of change in phase are highly desirable in sensor systems. In addition, the second graph also shows that the rate of change of the phase of V(t) becomes more gradual for increasing values of the damping factor $\zeta$. The inventor takes these characteristics as suggesting that with the appropriate damping factor, proof mass displacement sensing can serve as a superior direct velocity measurement technique that avoids any noise enhancement penalties that would be inherent in sensors having a variable sensitivity to velocity.

The V(f) magnitude curve shows that it is possible to select a damping factor $\zeta$, provided by the motion dampener 308, that achieves a desired frequency range over which the displacement of the proof mass 306 is substantially directly proportional to the velocity of the housing 304. (The selection process for the damping factor ζ is described in more detail below.) Accordingly, the damping factor ζ provided by the motion dampener 308 is preferably selected dependent upon a desired frequency range of interest, and the selected damping factor ζ is typically greater than 2.

As described above, one or more of the sensors 212 of the seismic data acquisition system 200 of FIG. 2 may be or include the direct velocity sensor 300. The light passing through optical fiber 312 may be split off from a fiber in one of the cables 210, and the modified coherent light 316 may form one of the modified light beams provided to the beam splitter 208 via the cables 210 and the array access port 110.

Figure 3B:
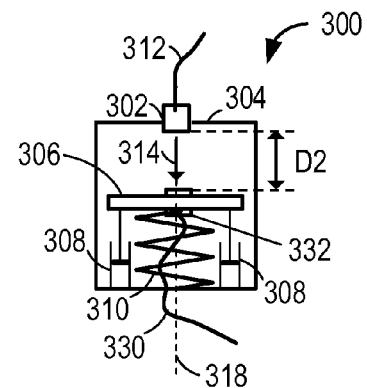

FIG. 3B shows an alternative embodiment of the direct velocity sensor 300. In the embodiment of FIG. 3B, a second optical cable 330 enters the housing 304 through the lower wall of the housing 304, and terminates at a terminator 332 mounted to the proof mass 306. A portion of the coherent light 314 produced by the terminator 302 is received by the terminator 332.

In the embodiment of FIG. 3B, when the housing 304 experiences a change in velocity with respect to time (i.e., an acceleration) along the sensing axis 318, a distance 'D2' between the terminators 302 and 332 either increases or decreases, depending on a direction of the acceleration. As a result of relative motion between the proof mass 306 and the housing 304, a length of the path that the coherent light travels within the housing 304 either increases or decreases, causing a change in the path length of the measurement beam relative to the reference beam. The damping factor provided by the motion dampener 308 is again selected to make the displacement D2 proportional to the velocity of the housing 304 over a frequency range of interest.

Figure 3C:
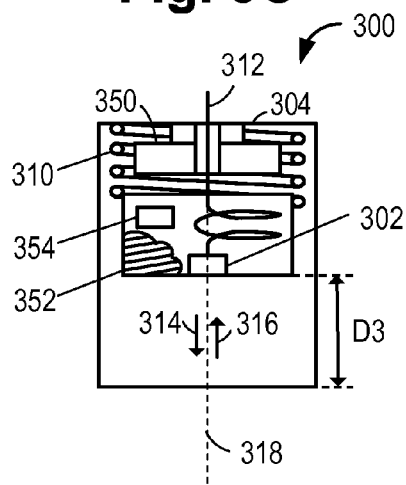

FIG. 3C shows another alternative embodiment of the direct velocity sensor 300. In the embodiment of FIG. 3C, the direct velocity sensor 300 includes a magnet 350 mounted within the housing 304 such that the magnet 350 moves with the housing 304. The proof mass 306 is, or includes, a coil of wire 352 having an axis parallel to the sensing axis 318, and having two ends. A portion of the coil of wire 352 is shown in FIG. 3C. An electrically resistive element 354 is electrically connected between the two ends of the coil of wire 352. As described in more detail below, the coil of wire 352 and the electrically resistive element 354 form a motion damper.

In the embodiment of FIG. 3C, the proof mass 306 is coupled to the upper wall of the housing 304 by the resilient component 310. The cable 312 enters the housing 304 through the upper wall and is connected to the proof mass by terminator 302. The terminator 302 directs the coherent light 314 toward an inner surface (e.g., the lower wall) of the housing 304. The inner surface is adapted to reflect a substantial portion of the incident coherent light 314. That is, the inner surface of the lower wall of the housing 304 is preferably highly reflective with respect to the incident coherent light 314. The coherent light 314 from the terminator 302 strikes the inner surface of the lower wall of the housing 304, and is reflected back toward the terminator 302 as the modified coherent light 316. The terminator 302 receives the modified coherent light 316 from the inner surface of the lower wall of the housing 304, and provides the modified coherent light 316 to the cable 312.

In the embodiment of FIG. 3C, when the housing 304 experiences an acceleration along the sensing axis 318, the momentum of the proof mass 306 delays the movement of the proof mass 306 relative to the housing 304, causing relative motion to occur between the proof mass 306 and the housing 304. A distance 'D3' between the terminator 302 and the inner surface of the lower wall of the housing 304 either increases or decreases, depending on a direction of the acceleration. As with previous embodiments, this displacement is made proportional to the velocity of the housing.

As described above, the coil of wire 352 and the electrically resistive element 354 form a motion damper. In the embodiment of FIG. 3C, as the housing 304 moves relative to the proof mass 306, the magnet 350 (coupled to the housing 304) moves relative to the coil of wire 352, inducing a current in the wire. The resistive element dissipates some of the electrical energy as heat, thereby damping motion of the proof mass. The resistance of the element 354, together with the resistance of the coil, is set to provide the desired damping factor.

FIG. 5 is a flowchart of one embodiment of a method 500 for constructing a seismic sensor (e.g., the direct velocity sensor 300 of FIGS. 3A-C). During a first step 502 of the method 500, a minimum frequency and a maximum frequency of a frequency range of interest are selected. Typical frequency ranges of interest for seismic sensing are 2-250 Hz, 1-500 Hz, 3-3000 Hz, and 6-8000 Hz. The frequency range of interest extends from the minimum frequency to the maximum frequency, and in step 504 the natural or resonant frequency of the system is chosen to be the near geometric mean of the minimum and maximum frequencies. That is, if the minimum frequency is termed '$f_L$' and the maximum frequency is termed '$f_H$', the ideal value for the natural or resonant frequency $f_n$ is $f_n = \sqrt{f_L \cdot f_H}$.

To implement a sensor with this natural frequency, the proof mass and resilient component spring constant are chosen in an appropriate ratio. When the mass of the sensor housing is much greater than the proof mass, the ratio of proof mass m and spring constant k can be chosen using the equation $$f_n = \frac{1}{2\pi}\sqrt{\frac{k}{m}}.$$

In block 506, the proof mass is connected to the sensor housing with a resilient component that enables the proof mass to oscillate at the natural or resonant frequency $f_n$.

In block 508, a dampening factor is determined. With reference to FIG. 4, it can be observed that the shape of the V(f) magnitude curve is determined by the dampening factor, and it is desired to provide a magnitude curve that is substantially flat over the frequency range of interest. In some embodiments, the system designer chooses a roll-off at the minimum and maximum frequencies $f_L$ and $f_H$. Thus, for example, the roll-off might be chosen to be 3 dB, meaning that at the minimum and maximum frequencies, the magnitude curve has dropped to $1/\sqrt{2}$ times the magnitude at the natural frequency. More specifically:

$$|V(f_L)| = 0.7071 \cdot |V(f_n)|, \text{ and}$$

$$|V(f_H)| = 0.7071 \cdot |V(f_n)|.$$

Using these equations, the appropriate value for the dampening factor ζ can be found using standard equation solving techniques. For example, a 3 dB roll off at the boundaries of a 2-250 Hz sensor is obtainable with a damping factor of ζ=5.5. Note that the dampening factor need not be limited to real valued numbers, but can be extended to complex valued numbers. In terms of implementation, complex dampening factors can be provided using electronic dampening with complex impedances rather than resistive elements. Such impedances employ capacitive or inductive elements in addition to dissipative resistors.

During a step 510, a motion dampener (e.g., the motion dampener 308 of FIGS. 3A-3B or 354 in FIG. 3C) is coupled to the proof mass, where the motion dampener provides the determined damping factor ζ. In step 512, a mechanism is provided for optically sensing the displacement of the proof mass relative to the housing. For example, one or more optical fibers can be mounted to the housing and/or proof mass to direct a measurement beam across the gap between the housing and the proof mass and parallel to the sensing axis. A secondary mechanism can be provided for recombining the measurement beam with a reference beam, either in the sensor housing or remote from the sensor housing. The resulting interference fringes can be monitored as previously described to determine the displacement of the proof mass relative to the housing.

When the housing is subjected to seismic waves in the frequency range of interest, the proof mass oscillates with a relative displacement equal to the rate of change of the seismic waves (subject to a relatively constant scale factor that changes only gradually with frequency). The oscillation of the proof mass is tracked by equipment that monitors phase changes in a light beam traversing the gap between the proof mass and the sensor housing. Those of ordinary skill in the art understand the complexities of extracting a position signal in a system that employs coherent interference with a reference beam, so such issues are not addressed further here.

The inventor has observed that existing optical seismic sensing systems may suffer from certain potential vulnerabilities that may be resolved with the disclosed direct velocity sensors, making these systems far more robust, versatile, and affordable. In existing systems, seismic accelerometers tend to be designed with underdamped parasitic resonances to achieve adequate sensitivity and substantially linear performance in the frequency range of interest. The parasitic resonances may be positioned far outside the frequency range of interest and would in most cases be of little concern due to the availability of electronic band-limiting filters. However, equivalent optical band-limiting filters are generally far more difficult to implement, making optical seismic systems vulnerable to certain weaknesses.

Optical seismic systems generally employ optical interferometry to remotely probe an array of seismic accelerometers and return an optical signal to receiver electronics for digitization and processing. Care should be taken to minimize the chance that the parasitic resonances might cause aliasing during the digitization process. In the case of systems employing wavelength and/or frequency multiplexing to concurrently collect measurements from multiple sensors, care should also be taken to minimize the chance that the parasitic resonances might cause crosstalk between sensors. To increase resistance to such effects, designers can employ implementation tradeoffs. For example, designers can increase digitization rates to fight aliasing, can widen the separation between frequency channels to fight crosstalk, and can employ more expensive band limiting optical filters to better attenuate the effects of parasitic resonances.

However, such tradeoffs may be made with certain assumptions regarding these parasitic resonances, which assumptions necessarily impose limits on the manner in which the sensor array can be employed. Thus, the tradeoffs chosen for a system design having an on-bottom cable in deep water may assume an incident energy level far lower than would be the case for a typical on-bottom cable in shallow water (less than about 100 feet deep) or for a towed streamer. Because the source(s) are generally positioned more closely to the sensing array in the latter configurations, these configurations tend to be far more likely to encounter excitation of parasitic resonances, and hence would typically require a sensing array design far more resistant to parasitic resonance effects. Conversely, the tradeoffs employed for a sensing array designed for towed or shallow water cable configurations might unnecessarily waste bandwidth and drive up costs of a deep water system.

The disclosed direct velocity sensors require no such parasitic resonances, and hence they may enable optical seismic system designers to avoid the difficulties created by such parasitic resonances. As can be seen in FIG. 4, the response of the disclosed direct velocity sensors is band-limited and essentially immune to parasitic resonances. Concerns about aliasing and crosstalk are sharply reduced when employing optical geophones in a wavelength and/or frequency multiplexed system, enabling the use of lower digitization rates, smaller and more closely spaced frequency channels, and/or band limiting optical filters with looser tolerances. Such systems would also tend to be more tolerant of different usage environments, enabling the same system design to be employed for deep water, shallow water, and towing surveys. One illustrative direct velocity optical sensor for an on-bottom cable system design was given a resonance frequency of 44.72 Hz and a damping factor of 2.1 (thereby providing a substantially flat response in the velocity domain between lower and upper roll-off frequencies of 10 Hz and 200 Hz, respectively). When compared with existing systems, the new design would be expected to reduce the required digitization rate by a factor of about 3.7, while simultaneously improving signal-to-noise ratio due to a significantly better response at low frequencies.

Other optical techniques for monitoring oscillation of a proof mass are known and can be employed. See, e.g., U.S. Pat. No. 5,134,882 (Taylor), U.S. Pat. No. 5,903,349 (Vohra), and U.S. Pat. No. 6,921,894 (Swierkowski) which employ strain sensing in optical fibers. Moreover, the direct velocity sensing techniques disclosed herein can be used in conjunction with any suitable position sensing method. The capacitance of an electrically conductive proof mass relative to a housing wall can be monitored to determine the displacement of the proof mass. Hall effect sensors can be used to monitor the displacement of a magnet on the proof mass or the housing. The resistance change induced by strain in a thin wire can be used to monitor relative displacement of the proof mass. Travel times of acoustic pulses can be used to monitor relative displacement of the proof mass. Numerous other variations and modifications will become apparent to those skilled in the art once the above disclosure is fully appreciated. For example, the disclosed direct velocity sensing technique is expected to have application outside the seismic sensing arena. It is intended that the following claims be interpreted to embrace all such variations and modifications.

What is claimed is:

1. A marine geophysical survey method that comprises:
deploying one or more cables or streamers in a marine environment, each cable or streamer having frequency- or wavelength-multiplexed optical geophones positioned at spaced intervals;
collecting velocity measurements from the optical geophones, wherein the collecting includes:
optically measuring in each geophone a displacement of a resiliently-coupled proof mass relative to a sensor housing, the proof mass being sufficiently damped to make the displacement proportional to a velocity of the housing over a frequency range of interest; and
imaging a survey region based at least in part on the velocity measurements.

2. The method of claim 1, wherein said deploying comprises at least one of: towing one or more steamers having said optical geophones while collecting velocity measurements; and resting one or more cables on bottom in shallow water, said cables having said optical geophones.

3. The method of claim 1, further comprising repeating said collecting and imaging to track movement of reservoir fluids.

4. The method of claim 1, wherein each said cable or streamer further includes hydrophones positioned at spaced intervals, and wherein said imaging the survey region is also based in part on measurements from the hydrophones.

5. The method of claim 1, wherein said collecting includes combining a light beam from each optical geophone with a reference beam.

6. The method of claim 1, wherein said collecting further includes employing wavelength and/or frequency multiplexing to concurrently obtain the velocity measurements from multiple optical geophones.

7. The method of claim 1, wherein said collecting includes receiving, with a terminator, light that has traveled between the proof mass and the housing.

8. A marine geophysical survey system that comprises:
   at least one seismic source;
   a seismic sensing array having one or more cables or streamers deployed in a marine environment, each cable or streamer having frequency- or wavelength-multiplexed optical geophones positioned at spaced intervals, wherein each optical geophone comprises:
   a housing; and
   a proof mass coupled to the housing by a resilient component, wherein motion of the proof mass is sufficiently damped to make displacement of the proof mass relative to the housing proportional to a velocity of the housing over a frequency range of interest; and
   a processing facility that optically measures the displacement of each proof mass to collect and store velocity measurements in response to firings of the at least one seismic source.

9. The system of claim 8, wherein the seismic sensing array comprises at least one towed marine streamer or at least one ocean-bottom cable.

10. The system of claim 9, wherein the seismic sensing array is permanently deployed for monitoring a subsurface reservoir.

11. The system of claim 8, wherein the seismic sensing array includes at least one cable on bottom in shallow water, said cable having said optical geophones.

12. The system of claim 8, wherein each cable or streamer in the seismic sensing array further includes hydrophones positioned at spaced intervals.

13. The system of claim 8, wherein each optical geophone further comprises a terminator adapted to receive light that has traveled between the proof mass and the housing.

14. The system of claim 13, wherein the terminator is coupled to the housing and adapted to receive light reflected from a surface the proof mass.

15. The system of claim 13, wherein the terminator is coupled to the proof mass and adapted to receive light reflected from a surface the housing.

16. The system of claim 13, wherein the terminator is coupled to the housing, and wherein each optical geophone further comprises another terminator coupled to the proof mass and adapted to direct light toward the housing-coupled terminator.

17. The system of claim 13, wherein the damping is provided by a motion dampener comprising a coil and a resistive element.

18. The system of claim 13, wherein the damping is provided by a motion dampener comprising a fluid.

19. The system of claim 13, wherein the damping is provided by a motion dampener that employs active damping.

\* \* \* \* \*